United States Patent [19]

Abe et al.

[11] Patent Number: 4,741,959

[45] Date of Patent: * May 3, 1988

[54] MAGNETIC RECORDING MEDIUM

[75] Inventors: Chiaki Abe, Ichikai; Hiroyuki Kanai; Akira Ishikawa, both of Utsunomia; Shigetoshi Suzue, Wakayama; Takashi Takeuchi, Utsunomia; Takahide Minami, Ichikai, all of Japan

[73] Assignee: Kao Corporation, Tokyo, Japan

[ * ] Notice: The portion of the term of this patent subsequent to Jun. 23, 2004 has been disclaimed.

[21] Appl. No.: 925,420

[22] Filed: Oct. 31, 1986

[30] Foreign Application Priority Data

Nov. 1, 1985 [JP] Japan .................................. 60-245591
Nov. 27, 1985 [JP] Japan .................................. 60-266875
Nov. 27, 1985 [JP] Japan .................................. 60-266876
Jan. 14, 1986 [JP] Japan .................................. 61-6104
Jan. 14, 1986 [JP] Japan .................................. 61-6105

[51] Int. Cl.$^4$ .............................................. G11B 5/71
[52] U.S. Cl. .................................. 428/403; 252/62.54; 427/128; 428/425.9; 428/522; 428/524; 428/532; 428/694; 428/695; 428/900
[58] Field of Search ...................... 428/694, 695, 425.9, 428/900, 403; 427/128, 127; 252/62.54; 360/134-136

[56] References Cited

U.S. PATENT DOCUMENTS

| | | | |
|---|---|---|---|
| 4,172,176 | 10/1979 | Tanaka | 428/495 |
| 4,383,000 | 5/1983 | Fujiki | 428/695 |
| 4,383,001 | 5/1983 | Fujiki | 428/695 |
| 4,522,885 | 6/1985 | Funahashi | 428/422 |
| 4,595,640 | 6/1986 | Chernega | 428/900 |
| 4,675,250 | 6/1987 | Kanai | 428/900 |

Primary Examiner—Ellis P. Robinson
Attorney, Agent, or Firm—Birch, Stewart, Kolasch & Birch

[57] ABSTRACT

A magnetic recording medium comprises a support the magnetic layer and a magnetic layer, coated on said support, comprising magnetic powder, a binder, (I) an ester compound having the formula:

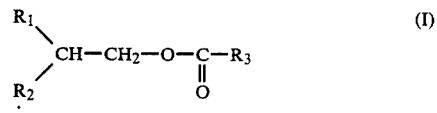

(I)

in which R1 and R2 are each a saturated alkyl group having 1 to 25 carbon atoms, branched or straight, the total carbon number of R1 and R2 being from 22 to 34, and R3 is a saturated or unsaturated alkyl group having 7 to 29 carbon atoms, branched or straight, and (II) an ester compound having the formula:

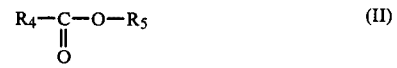

(II)

in which R4 is an aliphatic hydrocarbon group having 1 to 29 carbon atoms, straight or branched, and R5 is an aliphatic hydrocarbon group having 1 to 23 carbon atoms, straight or branched, or a straight aliphatic hydrocarbon group having 24 to 36 carbon atoms, the total carbon number of R4 and R5 being 15 to 65. Alternatively, the ester (II) compound can be replaced by an aliphatic acid having from 8 to 30 carbon atoms. The magnetic layer comprising compounds (I) and (II) may also include an aliphatic acid having from 10-30 carbon atoms.

10 Claims, No Drawings

MAGNETIC RECORDING MEDIUM

BACKGROUND OF THE INVENTION

1. Field of the Invention

The present invention relates to a magnetic recording medium. More particularly, it relates to a magnetic recording medium superior in durability.

2. Discussion of the Related Art

A magnetic recording medium is usually produced by coating a substrate, such as polyester film, with a magnetic paint composed of magnetic powder, binder resin, organic solvent, and other components. In the case of the floppy disk among the magnetic recording media, the magnetic layer is required to have good durability with a minimum of wear, because the magnetic layer of the floppy disk rubs against the magnetic head and jacket liner at the time of recording and reproducing.

One means commonly practiced to improve the wear resistance of the magnetic layer is to incorporate a lubricant into the magnetic layer. Examples of such a lubricant include fatty acids, oleyl oleate, butoxide stearate, fatty acid amides, liquid paraffin, and wax. These lubricants, however, are not necessarily satisfactory in their performance. For example, oleyl oleate and butoxide stearate do not improve the durability of the medium satisfactorily. Fatty acids such as stearic acid and oleic acid and hydrocarbon lubricants such as liquid paraffin effectively improve the durability but are poor in miscibility with the binder. When used in a large amount, they bleed out from the surface of the magnetic layer to stain the magnetic head.

SUMMARY OF THE INVENTION

A magnetic recording medium according to the present invention comprises a support and a magnetic layer coated on the support comprising magnetic powder, a binder, (I) an ester compound having from the formula:

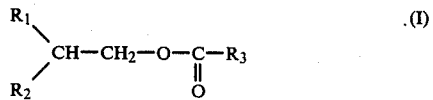

(I)

in which $R_1$ and $R_2$ are each a saturated alkyl group having from 1 to 25 carbon atoms, branched or straight, the total carbon number of $R_1$ and $R_2$ being from 22 to 34, and $R_3$ is a saturated or unsaturated alkyl group having from 7 to 29 carbon atoms, branched or straight, and (II) an ester compound having the formula:

(II)

in which R4 is an aliphatic hydrocarbon group having from 1 to 29 carbon atoms, straight or branched, and $R_5$ is an aliphatic hydrocarbon group having from 1 to 23 carbon atoms, straight or branched, or a straight aliphatic hydrocarbon group having from 24 to 36 carbon atoms, the total carbon number of $R_4$ and $R_5$ being 15 to 65.

It is preferable that the magnetic layer further comprises (III) an aliphatic acid having from 10 to 30 carbon atoms and the total carbon number of $R_4$ and $R_5$ of the ester compound (II) is from 16 to 65.

It is preferable that the magnetic layer comprises the ester compounds (I) and (II) in a total amount of 1 to 15 percent by weight based on the magnetic powder at a weight ratio of (I) to (II) in the range between 10/90 and 90/10.

It is further preferable that the magnetic layer comprises (I) and (III) in a total amount of 1 to 15 percent by weight based on the magnetic powder at a weight ratio of (I) to (III) in the range between 95/5 and 10/90.

The invention provides a magnetic recording medium having an intermediate layer. It further comprises, between the support and the magnetic layer, an intermediate layer comprising (1) one or more resins selected from a hydroxy-having polyester and a hydroxy-having polyurethane, (2) a polyisocyanate compound and (3) trisacetylacetonatoiron (III). Alternatively, the layer comprises (1) one or more resins selected from a hydroxy-having polyester and a hydroxy-having polyurethane, (2) a polyisocyanate compound and (4) cellulose nitrate. The intermediate layer preferably comprises 100 parts by weight of (1), 2 to 40 parts by weight of (2) and 0.01 to 8 parts by weight of (3). Alternatively, the intermediate layer preferably comprises 100 parts by weight of (1), 2 to 40 parts by weight of (2) and 5 to 50 parts by weight of (4).

The magnetic recording medium of the present invention is characterized in that the magnetic layer contains an ester compound represented by the formula (I) above {referred to as ester compound (I) hereinafter} and an ester compound represented by the formula (II) {referred to as ester compound (II) hereinafter}. These after compounds used in combination impart good lubricity to the magnetic layer, improving the durability of the magnetic recording medium to a great extent.

Ester compound (I) may be obtained by the esterification reaction of a branched-chain alcohol with a fatty acid. This branched-chain alcohol is, in general, called Guerbet alcohol.

In ester compound (II), $R_4$ should preferably be an aliphatic hydrocarbon having from 7 to 23 carbon atoms. It should preferably be a straight-chain hydrocarbon or a branched-chain hydrocarbon with a low-molecular weight branch, such as methyl group or ethyl group. Examples of the compound include tridecyl stearate, isotridecyl stearate, oleyl stearate, tridecyl palmitate, isotridecyl palmitate, cetyl myristate, isocetyl stearate, isostearyl palmitate, isostearyl oleate, and eicosyl myristate.

The above-mentioned ester compound (I) and ester compound (II) should usually be used in an amount (in total) of from 1 to 15 wt% based on the magnetic powder. The ratio of ester compound (I) to ester compound (II) should be in the range of 10/90 to 90/10.

The magnetic powder involved in the present invention includes, for example, fine acicular metal oxide, such as $\gamma\text{-}Fe_2O_3$, $Fe_3O_4$, and $CrO_2$; processed $\gamma\text{-}Fe_2O_3$ such as Co-coated $\gamma\text{-}Fe_2O_3$ and Co-doped $\gamma\text{-}Fe_2O_3$; iron metal powder; fine platy barium ferrite; magnetic powder with a portion of Fe atoms therein replaced by one or more members of Ti, Co, Zn, V, and Nb; and microfine powder of metal or alloy, such as Co, Fe-Co, and Fe-Ni. The iron metal powder may be doped with or surface-treated with nickel, cobalt, titanium, silicon, or aluminum in the form metallic atom, salt, or oxide, to improve its chemical stability. Such a treated one can also be used. For the purpose of stabilization, the iron metal powder may also be coated with thin oxide film by treatment in a weak oxidizing atmosphere. Such a treated one can also be used.

The binder that can be used in this invention includes, for example, polyurethane, polyester, polyvinyl chloride, vinyl chloride-vinyl acetate copolymer, polyacrylonitrile, nitrile rubber, epoxy resin, alkyd resin, polyamide, polyacrylate ester, polymethacrylate ester, polyvinyl acetate, polyvinyl butyral, polyvinylidene chloride, vinylidene chloride copolymer, cellulose nitrate, maleic acid-modified vinyl chloride-vinyl acetate copolymer, and ethyl cellulose. They may be used individually or in combination with one another. In addition, they may be incorporated with a plasticizer or hardener to control the hardness of the resin.

The amount of the binder is usually 15 to 60 parts by weight for 100 parts by weight of magnetic powder. No matter how great the binding power might be, the binder should be used in an amount more than 15 parts by weight; otherwise, the resulting magnetic coating lacks sufficient strength and adhesion with the substrate. On the other hand, the binder in excess of 60 parts by weight reduces the concentration of magnetic powder in the magnetic coating, which leads to a decreased output of reproduction and aggravates the characteristic properties of the coating.

The magnetic recording medium of this invention is characterized by that the magnetic layer contains an ester compound represented by the formula (I) above and a fatty acid having 8 to 30 carbon atoms. These compounds used in combination impart good lubricity to the magnetic layer, improving the durability of the magnetic recording medium. The reason for this is not known well.

The aliphatic acid to use in the invention preferably includes one having a saturated or unsaturated, straight-alkyl or branched-alkyl, having 8 to 24 carbon atoms. Examples of the fatty acid include caprylic acid, capric acid, lauric acid, myristic acid, palmitic acid, stearic acid, arachic acid, behenic acid, 12-stearic acid, oleic acid, linoleic acid, and erucic acid. The carbon number of 12 to 22 is especially preferred.

The above-mentioned ester compound and fatty acid should be used in an amount (in total) of 1 to 15 wt% based on the magnetic powder. The ratio of the ester compound to the fatty acid should be from 95/5 to 10/90, preferably from 95/5 to 50/50.

The above-mentioned ester compound (I), ester compound (II), and aliphatic acid (III) should usually be used in an amount (in total) of 1 to 15 wt% based on the magnetic powder. Ester compound (I), ester compound (II), and aliphatic acid (III) should account for 1 to 40 wt%, 10 and 80 wt%, and 1 to 40 wt%, respectively, in the total amount of the three compounds. Preferably, ester compound (I), ester compound (II), and aliphatic acid (III) should account for 5 to 35 wt%, 15 to 70 wt%, and 5 to 35 wt%, respectively, in the total amount of the three compounds.

The invention is further improved in prevention of swelling and dissolution by a solvent by insertion of the below described intermediate or primer layer between the support and the magnetic layer. It contains a specific resin having hydroxyl groups, a polyisocyanate compound, and trisacetylacetonatoiron (III), and such a intermediate layer provides a magnetic recording medium having good surface smoothness and good durability. The present invention was completed on the basis of these findings.

Accordingly, the present invention relates to a magnetic recording medium having a intermediate layer between the non-magnetic substrate and the magnetic layer, characterized in that the intermediate layer contains the following components.

(1) One kind or more than one kind of resin selected from the group consisting of polyester resin having hydroxyl groups and polyurethane resin having hydroxyl groups;
(2) Polyisocyanate compound; and
(3) Trisacetylacetonatoiron (III).

The polyester resin and polyurethane resin used in this invention are not specifically limited so long as they have hydroxyl groups at the terminals or branched chain of the molecule. Examples of commercial polyester resin include Biron 103, Vylon 200, Vylon 280, Vylon 290, Vylon 300, and Vylon 500 available from Toyobo Co., Ltd., and Unitika Elitel UE-3200, Unitika Elitel UE-3201, Unitika Elitel UE-3300, and Unitika Elitel UE-3400 available from Unitika Ltd. Examples of commercial polyurethane resin include Nippollan 5032, Nippollan 5033, and Nippollan 2301 available from Nippon Polyurethane Industry Co., Ltd.

The polyisocyanate compound used in this invention is a compound having two or more than two isocyanate groups in one molecule. It may be aromatic, aliphatic, or alicyclic. Examples of commercial polyisocyanate compounds include Coronate L, Coronate HL, and Coronate EH available from Nippon Polyurethane Industry Co., Ltd., and Sumidule L, Sumidule IL, Desmodule HL, Sumidule N, Sumidule HT, and Sumidule W available from Sumitomo Bayer Urethane Co., Ltd.

According to this invention, the polyisocyanate compound should preferably be used in an amount of 2 to 40 parts by weight for 100 parts by weight of the polyester resin having hydroxyl groups or the polyurethane resin having hydroxyl groups or a mixture thereof. If the amount of the polyisocyanate compound is less than 2 parts by weight, the crosslinking reaction does not take place completely. With an amount in excess of 40 parts by weight, it takes a long time for the isocyanate groups in the polyisocyanate compound to complete the reaction. This is undesirable. If the polyisocyanate compound partly remains unreacted, the intermediate layer is liable to blocking and sticks to the roll in the step of applying the magnetic paint.

The trisacetylacetonatoiron (III) is a red compound represented by the formula $Fe(C_5H_7O_2)_3$. This compound should preferably be used in an amount of 0.01 to 8 parts by weight for 100 parts by weight of the polyester resin having hydroxyl groups or the polyurethane resin having hydroxyl groups or a mixture thereof. With the amount less than 0.01 parts by weight, the curing reaction of the intermediate layer is very slow; and with the amount in excess of 8 parts by weight, blooming will take place on the surface of the primer layer.

The intermediate layer is formed by applying a intermediate solution to the non-magnetic substrate by gravure coating, reverse-roll coating, or other coating method, followed by drying. The intermediate solution is prepared by dissolving the above-mentioned components (1) to (3) in an organic solvent such as acetone, methyl ethyl ketone, cyclohexanone, and ethyl acetate. The intermediate solution may be incorporated with an inorganic pigment such as carbon black and titanium oxide for the prevention of static build-up or the light shielding.

The above shown intermediate layer may comprise (4) cellulose nitrate instead of trisacetylacetonatorion (III). This intermediate layer may further comprise (5) an organometallic compound or a tertiary amine.

The cellulose nitrate used in this invention is one called nitrocellulose for industrial use according to JIS K6703. It contains 10.7 to 12.2% of nitrogen. Examples of commercial ones include Celnova BTH½, Celnova HIG1/16, and Cellnova LIL¼ available from Asahi Chemical Industry Co., Ltd., and Celline FM-400 and Seluline FM-1600 available from Daisel Chemical Industry Co., Ltd. The cellulose nitrate should preferably be used in an amount of 5 to 50 parts by weight for 100 parts by weight of the polyester resin containing hydroxyl groups or the polyurethane resin containing hydroxyl groups or a mixture thereof. If the amount of the cellulose nitrate is less than the lower limit, the primer layer swells or dissolves under the influence of solvents. With an amount of the cellulose nitrate in excess of the upper limit, the intermediate layer is poor in adhesion to the base film.

The organometallic compound used in this invention includes, for example, trisacetylacetonatoiron (III) [Fe(C$_5$H$_7$O$_2$)$_3$], trisacetylacetonatomanganese (III) [Mn(C$_5$H$_7$O$_2$)$_3$], dibutyltin dioctate, dibutyltin diacetate, dibutyltin dilaurate, dioctylin dilaurate, tin octoate, tin oleate, lead naphthenate, lead oleate, tetrapropyl titanate, and tetra-n-butyl titanate.

The tertiary amine used in this invention includes, for example, triethylenediamine, triethylamine.

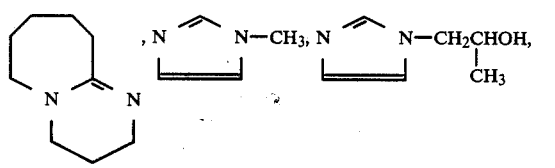

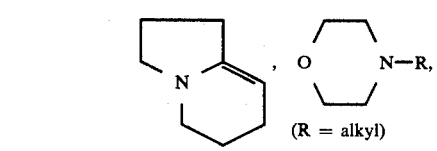

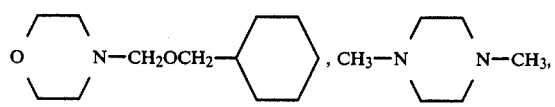

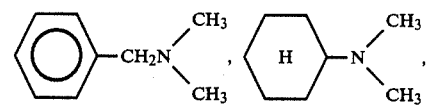

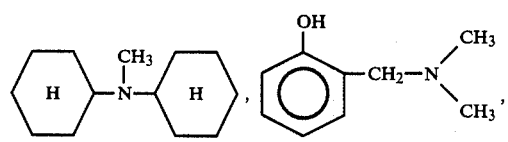

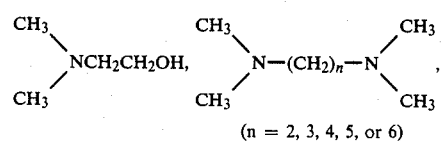

(n = 2, 3, 4, 5, or 6)

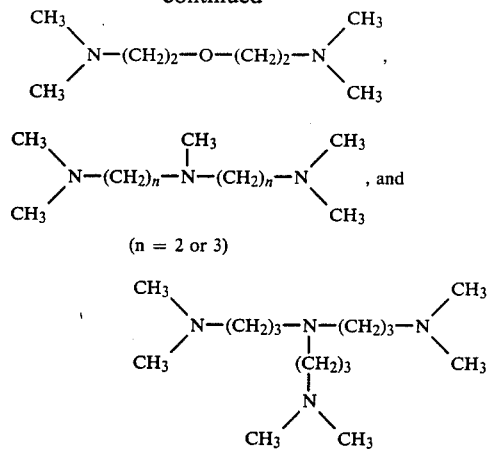

(n = 2 or 3)

In the case where one kind or more than one kind of the compound selected from the group consisting of the above-mentioned metallic compounds and tertiary amines are used, their amount should preferably be 0.001 to 8 parts by weight. An amount in excess of 8 parts by weight causes blooming on the surface of the primer layer, and an amount less than 0.001 parts by weight is not effective. These organometallic compounds or tertiary amines may act as a catalyst for urethane bond formation reaction.

The intermediate layer is formed by applying a solution to the non-magnetic substrate by gravure coating, reverse-roll coating, or other coating method, followed by drying. The solution is prepared by dissolving the above-mentioned components (1), (2) and (4), or (1), (2), (4) and (5) in an organic solvent such as acetone, methyl ethyl ketone, cyclohexanone, and ethyl acetate. The primer solution may be incorporated with an inorganic pigment such as carbon black and titanium oxide for the prevention of static build-up or the light shielding.

PREFERRED EMBODIMENTS

The invention is now described in more detail with reference to the following examples, which are not intended to limit the scope of the invention.

EXAMPLES 1 to 20

Mixtures of the following composition were prepared. The kind and amount of the ester compounds as lubricants added to the mixtures are shown in Tables 1, 2 and 3.

| | |
|---|---|
| Co-coated γ-Fe$_2$O$_3$ | 100 parts by weight |
| Vinyl chloride/vinyl acetate copolymer*[1] | 30 |
| Polyurethane resin 1*[2] | 27 |
| Polyurethane resin 2*[3] | 5 |
| Carbon black | 8 |
| α-Al$_2$O$_3$ | 4 |
| Toluene | 67 |
| Methyl ethyl ketone | 67 |
| Cyclohexanone | 100 |

Note:
*[1]VAGH, a product of Union Carbide Corp. in the U.S.
*[2]N2301, a product of Nippon Polyurethane Industry Co., Ltd.
*[3]N2304, a product of Nippon Polyurethane Industry Co., Ltd.

Each of the mixtures was mixed for 5 hours in a sand mill. After the addition of lubricants, mixing was continued for 10 hours with a ball mill. To the resulting mixture was added 5.4 parts by weight of polyisocyanate compound (N3200, a product of Sumitomo Bayer Urethane Co., Ltd.) Thus there were prepared 20 magnetic paints. Each paint was applied to a 75-μm thick polyethylene terephthalate film. The coating weight was adjusted as that the film thickness is 1.5 μm after drying. After drying, the coating film was subjected to calendering and then allowed to stand at 60° C. for 4 days to complete the curing reaction. The coated film was punched into disks, which were subsequently polished. In this way floppy disks were prepared.

Each of the floppy disks was examined for durability by running it on a special drive for accelerated test at 5° C. and 25° C. The durability is indicated by the running time required for the reproduction output to decrease to 70% of the initial value. The results are shown in Tables 1, 2 and 3. A reference to amount is based on parts by weight.

TABLE 1

| Example No. | Lubricant | Durability (h) 5° C. | 25° C. |
|---|---|---|---|
| 1 | 2-decyltetradecyl stearate/tridecyl stearate = 4/4 | 221 | 751 |
| 2 | 2-decyltetradecyl palmitate/isocetyl stearate = 3/4.5 | 205 | 675 |
| 3 | 2-decyltetradecyl oleate/isostearyl palmitate = 3.5/5 | 195 | 722 |
| 4 | 2-tetradecylhexadecyl beherate/isostearyl oleate = 4/4 | 206 | 733 |
| 5 | 2-decyltetradecyl stearate/oleyl stearate = 3.5/3.7 | 210 | 684 |

TABLE 2

| Example No. | Lubricant | Durability (h) 5° C. | 25° C. |
|---|---|---|---|
| 6 | 2-decyltetradecyl palmitate/tridecyl stearate/palmitic acid = 1.5/4/2 | 300 | 1000 |
| 7 | 2-decyltetradecyl stearate/tridecyl stearate/palmitic acid = 1.5/4/2 | 340 | 1200 |
| 8 | 2-decyltetradecyl oleate/tridecyl stearate/palmitic acid = 1.5/4/2 | 310 | 1250 |
| 9 | 2-decyltetradecyl isomyristate/tridecyl stearate/palmitic acid = 1.5/4/2 | 295 | 1100 |
| 10 | 2-decyltetradecyl laurate/cetyl myristate/myristic acid = 1.0/4/2.5 | 288 | 1000 |
| 11 | 2-decyltetradecyl behenate/isostearyl oleate/arachic acid = 08/4/2.2 | 290 | 985 |
| 12 | 2-octylhexadecyl isostearate/isocetyl stearate/palmitic acid = 1.2/3.8/2 | 285 | 950 |
| 13 | 2-dodecylhexadecyl laurate/eicosyl myristate/behenic acid = 1.5/4/2 | 290 | 985 |
| 14 | 2-tetradecyloctadecyl caprate/isostearyl oleate/erucic acid = 1.2/3.8/1.8 | 286 | 960 |

Quantities in parts by weight

TABLE 3

| Example No. | Lubricant | Durability (h) 5° C. | 25° C. |
|---|---|---|---|
| 15 | 2-decyltetradecyl stearate/palmitic acid = 5.6/2.4 | 215 | 735 |
| 16 | 2-decyltetradecyl palmitate/12-stearic acid = 4.8/3.2 | 205 | 716 |
| 17 | 2-decyltetradecyl oleate/behenic acid = 5/3 | 210 | 720 |
| 18 | 2-tetradecylhexadecyl behenate/myristic acid = 7.2/6.8 | 188 | 695 |
| 19 | 2-decyltetradecyl stearate/lauric acid = 6/2 | 198 | 705 |
| 20 | 2-hexadecyloctadecyl stearate/ | 196 | 711 |

TABLE 3-continued

| Example No. | Lubricant | Durability (h) 5° C. | 25° C. |
|---|---|---|---|
|  | capric acid = 4/4 | | |

COMPARATIVE EXAMPLES 1 TO 9

Nine magnetic paints were prepared in the same manner as in Example 1, except that lubricants were changed as shown in Table 4. Floppy disks were prepared from the magnetic paints and examined for durability in the same manner as shown in Example 1. Results are shown in Table 4.

TABLE 4

| Comparative Example No. | Lubricant | Durability (h) 5° C. | 25° C. |
|---|---|---|---|
| 1 | Isocetyl stearate/tridecyl stearate/palmitic acid = 3/3/2 | 168 | 300 |
| 2 | tridecyl stearate alone = 8 | 30 | 276 |
| 3 | tridecyl stearate/oleic acid = 4/4 | 95 | 305 |
| 4 | 2-hexyloctyl palmitate = 8 | 85 | 415 |
| 5 | 2-decyltetradecyl palmitate alone = 8 | 70 | 450 |
| 6 | tridecyl stearate/oleic acid = 5/3 | 180 | 360 |
| 7 | 2-hexyloctyl oleate/tridecyl stearate/oleic acid = 2/4/2 | 185 | 360 |
| 8 | oleyl oleate/oleic acid = 4/4 | 150 | 305 |
| 9 | palmitic acid/oleic acid = 3/5 | 30 | 106 |

EXAMPLE 21

The intermediate layer was prepared with the following solution composition.

| | |
|---|---|
| Biron, a tradename of a polyester available from Toyobo Co., Ltd. | 100 parts by weight |
| Coronate L, a tradename of polyisocyanate available from Nippon Polyurethane Industry Co., Ltd. | 15 |
| carbon black | 20 |
| trisacetylacetonatoiron (III) | 3 |
| methylethylketone | 700 |
| cyclohexanone | 350 |

The solution was coated on both sides of a sheet of polyethylene terephthalate having 75 micron thickness to have a dry thickness of 0.5 micron, followed by drying to obtain a primer layer.

Separately the following composition was kneaded to form a uniform dispersion with a ball mill and then mixed with 5.4 parts by weight of Coronate L to obtain a magnetic paint. The magnetic paint was coated further on both sides of the sheet to have a dry thickness of 1.0 micron. After drying, the sheet was treated with calendar rolls at 70° C. at a linear pressure of 250 kg/cm and cured at 50° C. for two days. A circle having a diameter 5.25 inches was cut out of the sheet to form a magnetic disk and then treated on the surface with an abrasive tape. It was put into a jacket.

The magnetic composition comprised:

| | |
|---|---|
| $\gamma$-Fe2O3 coated with Co | 100 parts by weight |
| VAGH | 17 |
| N2301 | 21 |
| N2304 | 3 |
| carbon black | 7 |
| $\alpha$-Al2O3 | 4 |
| tridecyl stearate | 4 |
| palmitic acid | 2 |

-continued

| | |
|---|---|
| 2-decyl-tetradecyl oleate | 2 |
| methylethylketone | 100 |
| toluene | 100 |
| cyclohexanone | 100 |

The magnetic disk was examined about durability in the same was as shown in Example 1 and then about output voltage and output fluctuation in the below shown manner. Results are shown in Table 5.

The output voltage and output fluctuation was measured at 125 kHz, using a commercial floppy disk drive. The output fluctuation is shown with the formula:

$$\text{Output fluctuation} = \frac{A - B}{A + B} \times 100 \, (\%)$$

where
A: Average output voltage produced by about 2000 times of magnetic flux inversion including the maximum output voltage in one round of the track.
B: Average output voltage produced by about 2000 times of magnetic flux inversion including the minimum output voltage in one round of the track.

EXAMPLE 22

A magnetic disk was prepared in the same way as shown in Example 21, except that 4 parts by weight of 2-decyl-tetradecyl stearate was used, not containing palmitic acid and 2-decyl-tetradecyl oleate, in the magnetic composition. Results are shown in Table 5.

EXAMPLE 23

An intermediate layer composition comprised 80 parts by weight of Biron, 18 parts by weight of Coronate L, 20 parts by weight of cellulose nitrate, Celline (tradename) availabe from Daicel Chemical Industries Ltd., 700 parts by weight of methylethylketone and 200 parts by weight of cyclohexanone. The magnetic layer composition had the same composition as used in Example 21, except that 8 parts by weight of carbon black, 5 parts by weight of 2-decyl-tetradecyl oleate and 3 parts by weight of behenic acid were used, not containing tridecyl stearate and palmitic acid. A magnetic disk was prepared from the above prepared compositions and examined in the same way as shown in Example 23. Results are shown in Table 5.

TABLE 5

| Example | 21 | 22 | 23 |
|---|---|---|---|
| output voltage (dB) | +4.0 | +4.0 | +3.5 |
| output fluctuation (%) | 3.0 | 3.2 | 3.1 |
| durability (h) | | | |
| at 5° C. | 310 | 221 | 210 |
| at 25° C. | 1250 | 751 | 720 |

The intermediate layer to use in the invention will be illustrated below in reference to reference examples.

EXAMPLE 24

A primer solution of the following composition was prepared.

| | |
|---|---|
| Vylon 200 | 100 parts by weight |
| Coronate L | 15 |
| Trisacetylacetonatoiron (III) | 2 |
| Methyl ethyl ketone | 600 |
| Cyclohexanone | 300 |

The primer solution was applied to both sides of a 75-μm thick polyethylene terephthalate base film. The coating weight was adjusted so that the primer layer has a thickness of 0.5 μm after drying.

A magnetic paint was prepared separately by thoroughly mixing and dispersing the following components in a ball mill and continuing mixing after the addition of 10 parts by weight of Coronate L as a polyisocyanate compound. The thus prepared magnetic paint was applied to both of the previously formed primer layers. The coating weight was adjusted so that the film thick is 1.0 μm after drying. After drying, the primer layers were calendered at 70° C. under a linear pressure of 250 kg/cm, followed by curing at 50° C. for 2 days. The coated film was punched into disks 5.25 inch in diameter, and each disk was polished and put into a jacket. The performance of the magnetic disk thus produced was evaluated.

| (Composition of magnetic paint) | |
|---|---|
| Co-containing γ-Fe$_2$O$_3$ powder | 100 parts by weight |
| Lecithin | 2 |
| Esrex A*[1] | 20 |
| Nippollan 2304*[2] | 20 |
| Conductex 975*[3] | 4 |
| α-Fe$_2$O$_3$ | 10 |
| Butyl stearate | 5 |
| Methyl ethyl ketone | 100 |
| Toluene | 100 |
| Cyclohexanone | 100 |

*[1]Vinyl chloride-vinyl acetate-vinyl alcohol copolymer made by Sekisui Chemical Co., Ltd.
*[2]Polyurethane resin made by Nippon Polyurethane Industry Co., Ltd.
*[3]Carbon black made by Columbia Carbon Co., Ltd.

EXAMPLE 25

Magnetic disks were prepared in the same manner as in Example 24 except that the primer solution was prepared by mixing and dispersing the following components in a ball mill.

| | |
|---|---|
| Conductex 975 | 30 parts by weight |
| Emalgen 910*[1] | 1 |
| Vylon 200 | 100 |
| Nippollan 2301*[2] | 100 |
| Coronate EH*[3] | 10 |
| Trisacetylacetonatoiron (III) | 1 |
| Methyl ethyl ketone | 900 |
| Cyclohexanone | 500 |

*[1]Nonionic surface active agent made by Kao Co., Ltd.
*[2]Polyurethane resin made by Nippon Polyurethane Industry Co., Ltd.
*[3]Polyisocyanate compound made by Nippon Polyurethane Industry Co., Ltd.

EXAMPLE 26

Magnetic disks were prepared in the same manner as in Example 24 except that the primer solution of the following composition was used.

| | |
|---|---|
| Nippollan 2301 | 100 parts by weight |
| Sumidule W*[1] | 20 |
| Trisacetylacetonatoiron (III) | 0.2 |
| Methyl ethyl ketone | 600 |
| Cyclohexanone | 300 |

*[1]Polyisocyanate compound made by Sumitomo Bayer Urethane Co., Ltd.

EXAMPLE 27

A primer solution of the following composition was prepared.

| Vylon 200 | 80 parts by weight |
|---|---|
| Coronate L | 18 |
| Seluline FM-200*[3] | 20 |
| Methyl ethyl ketone | 700 |
| Cyclohexanone | 200 |

*[3]Cellulose nitrate made by Daisel Chemical Industry Co., Ltd.

The primer solution was applied to both sides of a 75-μm thick polyethylene terephthalate base film. The coating weight was adjusted so that the primer layer has a thickness of 0.5 μm after drying.

A magnetic paint was prepared separately by thoroughly mixing and dispersing the following components in a ball mill and continuing mixing after the addition of 10 parts by weight of Coronate as a polyisocyanate compound. The thus prepared magnetic paint was applied to both of the previously formed primer layers. The coating weight was adjusted to that the film thick is 1.0 μm after drying. After drying, the primer layers were calendered at 70° C. under a linear pressure of 250 kg/cm, followed by curing at 50° C. for 2 days. The coated film was punched into disks 5.25 inch in diameter, and each disk was polished and put into a jacket. The performance of the magnetic disk thus produced was evaluated.

| (Composition of magnetic paint) | |
|---|---|
| Co-containing γ-$Fe_2O_3$ powder | 100 parts by weight |
| Lecithin | 2 |
| Esrex A*[1] | 20 |
| Nippollan 2304*[2] | 20 |
| Conductex 975*[3] | 4 |
| α-$Fe_2O_3$ | 10 |
| Butyl stearate | 5 |
| Methyl ethyl ketone | 100 |
| Toluene | 100 |
| Cyclohexanone | 100 |

*[1]Vinyl chloride-vinyl acetate-vinyl alcohol copolymer made by Sekisui Chemical Co., Ltd.
*[2]Polyurethane resin made by Nippon Polyurethane Industry Co., Ltd.
*[3]Carbon black made by Columbia Carbon Co., Ltd.

EXAMPLE 28

Magnetic disks were prepared in the same manner as in Example 27 except that the primer solution was prepared by mixing and dispersing the following components in a ball mill.

| Conductex 975 | 30 parts by weight |
|---|---|
| Emalgen 910*[1] | 1 |
| Vylon 200 | 40 |
| Nippollan 2301 | 30 |
| Coronate EH | 10 |
| Seluline FM-400 | 30 |
| Methyl ethyl ketone | 1100 |
| Cyclohexanone | 600 |

*[1]Nonionic surface active agent made by Kao Co., Ltd.

EXAMPLE 29

Magnetic disks were prepared in the same manner as in Example 27 except that the primer solution of the following composition was used.

| Nippollan 2301 | 100 parts by weight |
|---|---|
| Sumidule W*[1] | 30 |
| Celnova BTH½*[2] | 10 |
| Methyl ethyl ketone | 600 |
| Cyclohexanone | 300 |

*[1]Polyisocyanate compound made by Sumitomo Bayer Urethane Co., Ltd.
*[2]Cellulose nitrate made by Asahi Chemical Industry Co., Ltd.

EXAMPLE 30

Magnetic disks were prepared in the same manner as in Example 27 except that the primer solution of the following composition was used.

| Unitika Eryther UE-3200*[1] | 90 parts by weight |
|---|---|
| Sumidule IL*[2] | 5 |
| Seluline FM-200 | 10 |
| Trisacetylacetonatoiron (III) | 0.05 |
| Methyl ethyl ketone | 700 |
| Cyclohexanone | 100 |
| Methyl isobutyl ketone | 200 |

*[1]Polyester resin made by Unitika Ltd.
*[2]Polyisocyanate compound made by Sumitomo Bayer Urethane Co., Ltd.

EXAMPLE 31

Magnetic disks were prepared in the same manner as in Example 30 except that the trisacetylacetonatoiron (III) (0.05 parts by weight) was replaced by dibutyltin dilaurate (0.5 parts by weight).

EXAMPLE 32

Magnetic disks were prepared in the same manner as in Example 30 except that the trisacetylacetonatoiron (III) (0.05 parts by weight) was replaced by triethylenediamine (1 part by weight).

Each magnetic disk obtained above was examined in the same was as shown in Example 21. It is noted from results appearing in Table 6 that the intermediate layer improve the resulting disk in the output voltage and the output fluctuation and then a resistance to a solvent.

TABLE 6

| Example | Description of primer layer | Output voltage (dB) | Output fluctuation (%) |
|---|---|---|---|
| Example 24 | — | +3.5 | 4.3 |
| Example 25 | — | +2.0 | 5.1 |
| Example 26 | — | +4.0 | 3.1 |
| Example 27 | — | +3.0 | 4.6 |
| Example 28 | — | +3.0 | 3.2 |
| Example 29 | — | +3.0 | 3.3 |
| Example 30 | — | +4.0 | 2.0 |
| Example 31 | — | +4.0 | 3.7 |
| Example 32 | — | +3.5 | 4.1 |

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A magnetic recording medium which comprises a support and a magnetic layer coated on said support, said magnetic layer comprising 100 parts magnetic powder, 15 to 60 parts of a binder, (I) an ester compound having the formula:

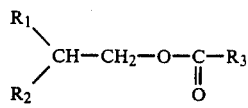

in which R1 and R2 are each a saturated alkyl group having 1 to 25 carbon atoms, branched or straight, the total carbon number of R1 and R2 being from 22 to 34, and R3 is a saturated or unsaturated alkyl group having 7 to 29 carbon atoms, branched or straight, and (II) an ester compound having the formula:

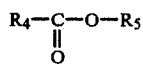

in which R4 is an aliphatic hydrocarbon group having from 1 to 29 carbon atoms, straight or branched, and R5 is an aliphatic hydrocarbon group having from 1 to 23 carbon atoms, straight or branched, or a straight aliphatic hydrocarbon group having from 24 to 36 carbon atoms, the total carbon number of R4 and R5 being 15 to 65.

2. A magnetic recording medium according to claim 1, in which said magnetic layer further comprises (III) an aliphatic acid having from 10 to 30 carbon atoms and the total carbon number of R4 and R5 of the ester compound (II) is from 16 to 65.

3. A magnetic recording medium which comprises a support and a magnetic layer coated on said support, said magnetic layer comprising 100 parts magnetic powder, 15 to 60 parts of a binder, (I) an ester compound having the formula:

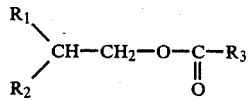

and (III) an aliphatic acid having from 8 to 30 carbon atoms.

4. A magnetic recording medium according to claim 1, in which said magnetic layer comprises ester compounds (I) and (II) in a total amount of 1 to 15 percent by weight based on the magnetic powder at a weight ratio of (I) to (II) in the range between 10/90 and 90/10.

5. A magnetic recording medium according to claim 2, in which said magnetic layer comprises 1 to 40 percent by weight of (I), 10 to 80 percent by weight of (II) and 1 to 40 percent by weight of (III) in a total amount of 1 to 15 percent by weight based on the magnetic powder.

6. A magnetic recording medium according to claim 3, in which said magnetic layer comprises the esters (I) and aliphatic acid (III) in a total amount of 1 to 15 percent by weight based on the magnetic powder at a weight ratio of the ester (I) to aliphatic acid (III) in the range between 95/5 and 10/90.

7. A magnetic recording medium according to claim 1, which further comprises, between said support and said magnetic layer, an intermediate layer comprising (1) one or more resins selected from a hydroxy containing polyester and a hydroxy-having polyurethane, (2) a polyisocyanate compound and (3) trisacetylacetonatoiron (III).

8. A magnetic recording medium according to claim 1, which further comprises, between said support and said magnetic layer, an intermediate layer comprising (1) one or more resins selected from a hydroxy-having polyester and a hydroxy-having polyurethane, (2) a polyisocyanate compound and (3) cellulose nitrate.

9. A magnetic recording medium according to claim 7, in which said intermediate layer comprises 100 parts by weight of (1), 2 to 40 parts by weight of (2) and 0.01 to 8 parts by weight of (3).

10. A magnetic recording medium according to claim 8, in which said intermediate layer comprises 100 parts by weight of (1), 2 to 40 parts by weight of (2) and 5 to 50 parts by weight of (3).

* * * * *